BEST AVAILABLE COPY

J. Davis.
Car Brake.

№ 1,857. Reissued Jan 31, 1865.

Witnesses:
James J. Johnston
Alexander Hay

Inventor:
John Davis

BEST AVAILABLE COPY

UNITED STATES PATENT OFFICE.

JOHN DAVIS, OF ALLEGHENY CITY, PENNSYLVANIA.

IMPROVEMENT IN RAILROAD-CAR BRAKES.

Specification forming part of Letters Patent No. 40,332, dated October 20, 1863; Reissue No. 1,857, dated January 31, 1865.

*To all whom it may concern:*

Be it known that I, JOHN DAVIS, of Allegheny City, in the county of Allegheny and State of Pennsylvania, have invented a new and useful Improvement in Railroad-Car Brakes; and I do hereby declare that the following is a full and exact description thereof, reference being had to the accompanying drawings, and to the letters of reference marked thereon.

The nature of my invention consists in so constructing and arranging the brakes of railroad cars that the brakes are brought to bear on the wheels the instant that the cars are relieved or released from the tension or draft of the motive power, and also in relieving the wheels from the pressure of the brakes by the action of said motive power, the whole being constructed, arranged, and operating substantially in the manner hereinafter described.

To enable others skilled in the art of constructing brakes for railroad-cars to make and use my invention, I will proceed to describe its construction and operation.

Figure 2:
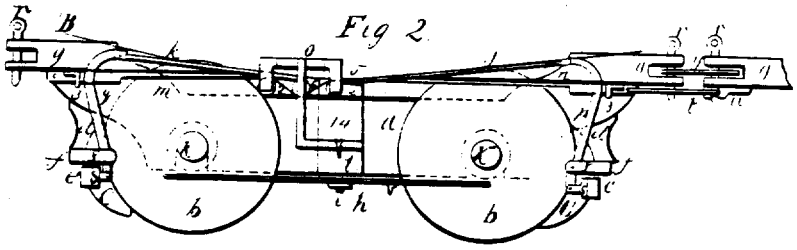
Figure 3:
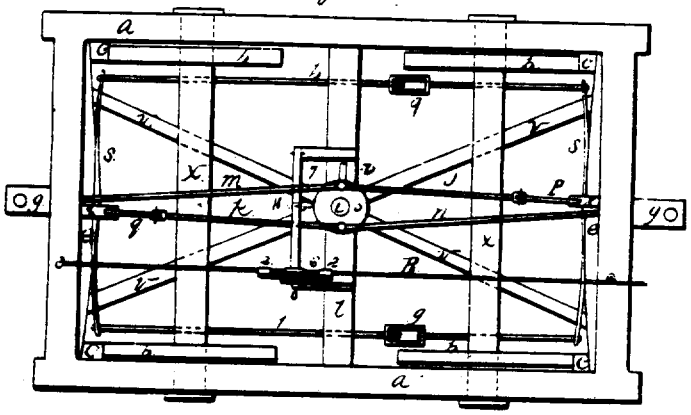
Figure 1:
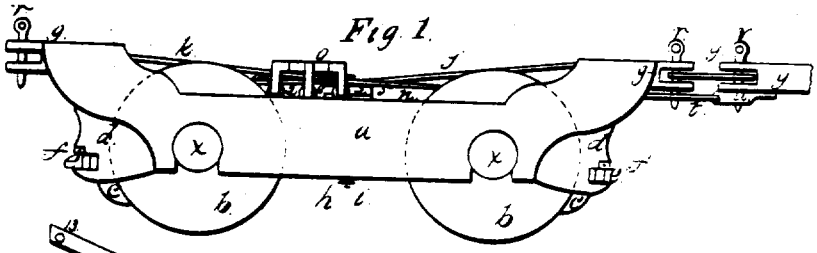
Figure 4:
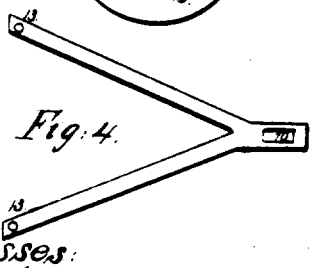
Figure 5:
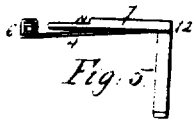

In the accompanying drawings, Figure 1 is a side view of a car-truck furnished with my improved brake. Fig. 2 is a longitudinal section of the truck and brakes. Fig. 3 is a top view of the truck and brakes. Fig. 4 is a top view of a brace used in connection with the brakes. Fig. 5 is a side view of a stop or catch used in connection with the brakes.

*a* represents the frame of the truck. *b* represents the wheels. *x* represents the axles. *c* represents the brakes, which are attached to the bars *e*, which are held in their proper position by means of the guide-plates *d*, which are braced by the cross-bars *f*, and are secured to the frame of the truck. To the bars *e* are attached the springs *s*, which are connected with each other by rods 1, which are furnished with swivel-links 9, for the purpose of shortening or lengthening the rods so as to obtain the desired traction of the springs *s* and brakes *c*. On the springs *s* are lugs, to which the lower end of the levers *p* and *q* are attached, the fulcrums of which are on the cross-bars *f*, and marked 8. To the upper end of the levers *p* and *q* are attached rods *j* and *k*, which are attached to a swivel-plate, 5, on the end of the upright piece 14, which rests on the cross-bar *l*. Through it and the upright piece 14 passes a bolt, *i*, which holds the swivel plate 5 and the stays *v* in the desired position by means of the nut *h*. The ends 13 of the stays are attached to the bars *e*, and the bolt *i* passes through the slot 10 of the other end. By the use of the slot 10 the stays can move back and forward with the brakes. To the swivel-plate 5 are attached rods *m* and *n*, which are held in their position by the piece marked 3, and are connected to the car or motive power by a coupling-link, *t*.

*g* represents the ordinary car "bumper." *y* represents the ordinary coupling-link, and *r* represents a common coupling-pin.

The T-shaped piece (marked *o*) and the catch, (marked 7,) in connection with the cord B and pawl Z on the swivel-plate 5, are used for the purpose of holding the brakes off the wheels when so desired. The piece *o* is secured to the cross-bar *l*, and is furnished with two pulleys, 2. The piece 7 is also attached to the cross-bar *l*, and is furnished with a joint at 12, a recess (marked *w*) and a spring, (marked 4,) on the end of which is a friction-pulley, 6. By the use of this spring the slack of the cord B is taken up, so that the first pull on the cord will bring the piece 7 up into the desired position for receiving the pawl Z in the recess *w*. The cord B passes over the pulleys 2 and under the pulley 6, and may extend from the hindmost car through the whole train to the platform of the locomotive, so that the engineer can, by means of a lever or other device, hold the brakes off the wheels when so desired.

The operation of my improvement in brakes is as follows: Having all things constructed and arranged as herein described and represented, I give the desired traction or force to the springs and brakes by turning the swivel-links 9, which will shorten the rods 1, which will stiffen the springs *s*, which will bring the brakes *c* with force on the wheels. The force of the brakes is taken off the wheels by the locomotive or motive power, which will in its first action or motion draw forward the link *t*, which will draw forward the rods *m* and *n*, which will turn the plate 5, which will draw the upper end of the levers *p* and *q* toward the center of the truck, which will cause the lower

BEST AVAILABLE COPY end of the levers to throw back the bars *e*, which will relieve the wheels from the pressure of the brakes.

The brakes can be held off the wheels when so desired by simply drawing forward the cord B, which will raise the piece 7 so that the recess *w* will catch the pawl Z, as shown at 11 in Fig. 3. The brakes are thrown on by drawing forward the rods *m* and *n* and slackening the cord B, so that the piece 7 may drop down and thereby release the pawl Z.

It will readily be observed by the skillful mechanic that my improved brakes may be operated by means of the ordinary hand-wheel and ratchet now in common use on cars by simply attaching a piece of chain to the rods *m* and *n* and to the shaft of the hand-wheel.

When the hand-wheel is used in connection with my improvement, the brakes are thrown with all the force desired on the wheels by simply unshipping the ratchet, thus bringing the brakes to bear on the wheels in the shortest time possible, which is a thing much desired in time of danger.

There is this difference between the operation of my improved brakes and the ordinary brakes now in use, to-wit: The ordinary brakes are wound up to bring them to bear on the wheels. In my mode of operating they are wound up to relieve the wheels from the brakes. In the ordinary brakes the ratchet is unshipped to relieve the wheels from the brakes. I unship the ratchet to bring the brakes to bear on the wheels.

Having thus described the nature, construction, and operation of my improvement in brakes, what I claim as of my invention is—

1. A brake for wheel-vehicles, brought to bear on the wheel by a spring and a cessation or relaxation of the power applied to draw the vehicle, and retracted therefrom by the said drawing power, substantially as herein described, and for the purpose set forth.

2. The arrangement of the bars *e* and *f*, guide-plate *d*, brakes *c*, springs *s*, levers *p* and *q*, rods 1, *j*, *k*, *m*, and *n*, swivel-plate 5, pieces 0 and 7, and brace *v*, the whole being constructed, arranged, and operating in the manner and by the means herein described, and for the purpose set forth.

JOHN DAVIS.

Witnesses:
JAMES J. JOHNSTON,
ALEXANDER HAYS.